(12) United States Patent
Liang

(10) Patent No.: US 7,780,414 B1
(45) Date of Patent: Aug. 24, 2010

(54) TURBINE BLADE WITH MULTIPLE METERING TRAILING EDGE COOLING HOLES

(75) Inventor: George Liang, Palm City, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 0 days.

(21) Appl. No.: 11/654,126

(22) Filed: Jan. 17, 2007

(51) Int. Cl.
*F01D 5/18* (2006.01)
*B22C 9/10* (2006.01)

(52) U.S. Cl. .................. 416/97 R; 415/115; 164/369
(58) Field of Classification Search ............... 164/369; 416/97 R; 415/115
See application file for complete search history.

(56) References Cited

U.S. PATENT DOCUMENTS

| | | | |
|---|---|---|---|
| 4,278,400 A | 7/1981 | Yamarik et al. | |
| 4,474,532 A | 10/1984 | Pazder | |
| 4,515,526 A | 5/1985 | Levengood | |
| 4,596,281 A | 6/1986 | Bishop | |
| 4,627,480 A | 12/1986 | Lee | |
| 4,752,186 A * | 6/1988 | Liang | 416/97 R |
| 4,753,575 A | 6/1988 | Levengood et al. | |
| 4,775,296 A | 10/1988 | Schwarzmann et al. | |
| 4,786,233 A | 11/1988 | Shizuya et al. | |
| 4,992,026 A | 2/1991 | Ohtomo et al. | |
| 5,050,665 A | 9/1991 | Judd | |
| 5,337,805 A * | 8/1994 | Green et al. | 164/369 |
| 5,387,085 A | 2/1995 | Thomas, Jr, et al. | |
| 5,403,159 A | 4/1995 | Green et al. | |
| 5,462,405 A * | 10/1995 | Hoff et al. | 416/97 R |
| 5,599,166 A * | 2/1997 | Deptowicz et al. | 416/97 R |
| 5,702,232 A | 12/1997 | Moore | |
| 5,931,638 A * | 8/1999 | Krause et al. | 416/97 R |
| 5,975,851 A | 11/1999 | Liang | |
| 6,062,817 A | 5/2000 | Danowski et al. | |
| 6,099,251 A | 8/2000 | LaFleur | |
| 6,126,396 A | 10/2000 | Doughty et al. | |
| 6,139,269 A | 10/2000 | Liang | |
| 6,164,913 A | 12/2000 | Reddy | |
| 6,634,858 B2 | 10/2003 | Roeloffs et al. | |
| 6,637,500 B2 | 10/2003 | Shah et al. | |
| 6,902,372 B2 | 6/2005 | Liang | |

(Continued)

*Primary Examiner*—Jessica L Ward
*Assistant Examiner*—Kevin E Yoon
(74) *Attorney, Agent, or Firm*—John Ryznic

(57) ABSTRACT

A ceramic core used to make a first or second stage turbine blade in an industrial gas turbine engine. The ceramic core includes a serpentine flow forming pierce with a trailing edge cooling supply channel forming piece on the trailing edge end. Three rows of metering holes are formed by a core piece in which a continuous flow channel piece on the tip portion and the root portion of the blade support the core piece that forms the metering holes and impingement cavity pieces such that the ceramic core is rigid and strong to prevent shear force and local bending of the core during casting will not break the core. A first and a second stage turbine blade is formed from the ceramic core and includes a forward flowing serpentine flow circuit for the first stage blade with the first channel of the serpentine flow circuit forming the trailing edge supply channel. A second stage blade includes an aft flowing serpentine flow circuit with the last channel forming the trailing edge supply channel. The three rows of metering holes allow for a gradual pressure drop from the high pressure trailing edge cooling supply channel and out the discharge holes or ducts along the edge of the blade.

10 Claims, 5 Drawing Sheets

U.S. PATENT DOCUMENTS

| | | |
|---|---|---|
| 6,915,840 B2 | 7/2005 | Devine, II et al. |
| 6,929,054 B2 | 8/2005 | Beals et al. |
| 6,966,756 B2 | 11/2005 | McGrath et al. |
| 7,270,515 B2 * | 9/2007 | Liang ........................ 416/97 R |
| 2003/0133795 A1 * | 7/2003 | Manning et al. .......... 416/97 R |
| 2005/0281671 A1 * | 12/2005 | Liang ............................ 416/1 |
| 2006/0133935 A1 * | 6/2006 | Papple ...................... 416/97 R |

\* cited by examiner

TURBINE BLADE WITH MULTIPLE METERING TRAILING EDGE COOLING HOLES

BACKGROUND OF THE INVENTION

1. Field of the Invention

The present invention relates generally to fluid reaction surfaces, and more specifically to a ceramic core used to make an industrial gas turbine first or second stage blade.

2. Description of the Related Art Including Information Disclosed Under 37 CFR 1.97 and 1.98

Conventional gas turbine engines include a compressor, a combustor, and a turbine. Air flows axially through the sections of the engine. As is well known in the art, air compressed in the compressor is mixed with fuel which is burned in the combustor and expanded in the turbine, thereby rotating the turbine and driving the compressor. The turbine components are subjected to a hostile environment characterized by the extremely high temperatures and pressures of the hot products of combustion that enter the turbine. In order to withstand repetitive thermal cycling in, such a hot environment structural integrity and cooling of the turbine airfoils must be optimized.

Cooling schemes for airfoils have become very sophisticated in modern engines. The airfoils include intricate internal cooling passages that extend radially within the very thin airfoil. The radial passages are frequently connected by a plurality of small crossover holes to allow the flow of cooling air between the passages. Fabrication of airfoils with such small internal features necessitates a complicated multi-step manufacturing process.

A problem with the current manufacturing process is that it is characterized by relatively low yields. The main reason for the low yields is that during the manufacturing process of airfoils, a ceramic core that defines the cooling passages of the airfoil often either breaks or fractures. There are a number of factors that contribute to such a high percentage of ceramic cores becoming damaged. First, ceramic, in general, is a brittle material. Second, the airfoils are very thin and subsequently, the cores are very thin. Finally, the small crossover holes in the airfoil result in narrow fingers in the core that is easily broken under load.

Another major factor contributing to cores being damaged during airfoil fabrication is that the fragile cores are handled repeatedly, undergoing many manufacturing processes, thereby increasing the chances for the core to break. In such processes, the core is first manually removed from a die and can be easily broken during handling. Subsequently, the core is secured within a mold and pressurized wax is injected into the mold around the core. As the pressurized wax is injected around the core, the core is subjected to shearing, bending and torsion loads that may either crack or break the core. The wax mold, with the core secured inside, is then dipped into a slurry to form layers of coating or a "shell". The wax is then melted out from the shell, forming a mold with the core secured therein. The shell, with the core secured therein, is subsequently heated. The heating process of the shell with the core results in different rates of expansion of the ceramic core and the shell. The difference in growth of the shell and the core frequently results in the core being fractured or broken since the shell generally expands at a faster rate than the core, thereby stretching the core and breaking it. The next step in the manufacturing process is injecting molten metal into the shell with the core secured therein. As the molten metal is poured into the shell, it may have non-uniform flow, causing shear, bending, and torsion loads on the core. As the molten metal solidifies, the core is then chemically removed from the airfoil. Once the core is removed, the area occupied by the core becomes the internal cavity for cooling air to pass through within the airfoil.

Fractures or breakage of the core during the manufacturing process is frequently detected only after the part is completed. Even a hairline fracture in the core developed at any stage of the manufacturing process will undermine the integrity of an airfoil and result in necessary of scrapping the finished part. One financial disadvantage of obtaining a low yield of good parts is that the effective cost of each usable airfoil is very high.

Another drawback is that the fragile nature of the ceramic cores results in production constraints that limit more optimal cooling schemes. In many instances it may be more advantageous for the airfoil cooling and engine efficiency to have smaller crossover holes or more intricate geometric features. However, more intricate cooling passages are not practical at this time, since the current manufacturing process already yields an insufficiently small number of usable airfoils and has a high percentage of ceramic cores being damaged. More intricate cooling schemes would result in even lower manufacturing yields and even higher, cost per airfoil. Thus, there is a great need to improve manufacturability of the gas turbine engine airfoils to reduce the cost of each airfoil as well as to improve cooling schemes therefor.

The prior art U.S. Pat. No. 5,599,166 issued to Deptowicz et al on Feb. 4, 1997 and entitled CORE FOR FABRICATION OF GAS TURBINE ENGINE AIRFOILS discloses a ceramic core for making a turbine blade and the turbine blade made from the core. The turbine blade in this patent is a small blade of about 2 inches in spanwise length that is used in an aero gas turbine engine. The Deptowicz et al invention makes use of fingers 148, 166 and 172 in the core that corresponds to the crossover holes (also called metering holes) and provides the structural rigidity to the core during the casting process. One problem with using the teaching of the Deptowicz et al disclosure is that scaling of the core for use to make a large turbine blade in an industrial gas turbine engine will result in metering holes too large, resulting in a large cooling air flow through the trailing edge metering holes.

The Green et al U.S. Pat. No. 5,403,159 issued on Apr. 4, 1995 and entitled COOLABLE AIRFOIL STRUCTURE discloses a turbine airfoil used in an aircraft, the airfoil having a trailing edge cooling circuit with a double impingement cooling hole arrangement. The impingement holes are formed in a pair of spanwise extending ribs 106 and 108 with cooling holes 112 formed therein. A cooling air passage exists between the ends of the ribs and the interior surface of the airfoil. The length between the first rib 106 to the surface 22 is ½ the length of the second rib 108 to the surface 22.

Two prior art patents issued to Liang (the inventor of this present invention) U.S. Pat. No. 5,975,851 issued on Nov. 2, 1999 and entitled TUURBINE BLADE WITH TRAILING EDGE ROOT SECTION COOLING and U.S. Pat. No. 6,139, 269 issued on Oct. 31, 2000 and entitled TURBINE. BLADE WITH MULTI-PASS COOLING AND COOLING AIR ADDITION both disclose a first stage turbine blade used in an aircraft gas turbine engine. Both blades include a trailing edge cooling circuit with double impingement holes formed in the ribs that extend between a tip pedestal at the top and a platform at the bottom. Impingement holes are formed in the two ribs, and root impingement holes (60 in this patent) are formed between the rib and the platform. The cooling flow area of the holes 60 and 61 are equal to ½ the cooling flow area of the impingement holes 58 and 59.

The known methods of forming a turbine blade used in an aero engine will not work for the same design scaled to the size of a first or second stage turbine blade used in an industrial gas turbine (IGT) engine. The first stage turbine blade in an aero engine is from one to two inches in length, while the same stage blade in an IGT engine is five to ten inches in length. For one thing, the cooling flow path is much longer in the IGT blade than in the aero blade. Also, the ceramic core uses very small impingement cooling holes in the aero blade. If the impingement holes in the ceramic core used to make the aero blade were scaled up to make an IGT blade, the holes would be too large and discharge more cooling air than needed. Thus, a twin impingement cooling hole arrangement shown in the Green '159 patent; the Liang '851 patent; and the Liang '269 patent would not be practical in a scaled up version for an IGT blade.

The object of the present invention is to provide for a ceramic core used to form a turbine blade used in an industrial gas turbine engine that will be stronger than those of the cited prior art such that less defective blades are cast.

Another object of the present invention is to provide for a turbine blade for use in an industrial gas turbine engine with a more efficient cooling circuit for the blade.

Still another object of the present invention is to provide for a turbine blade for use in an industrial gas turbine engine with improved means of controlling and directing internal cooling air within the blade.

BRIEF SUMMARY OF THE INVENTION

The present invention is a first or second stage turbine blade used in an industrial gas turbine (IGT) engine. The blade includes a trailing edge cooling circuit having a plurality of exit ducts along the trailing edge that are supplied with cooling air that passes through a triple impingement circuit in order to reduce the cooling air pressure from the supply channel and into the exit ducts without wasting energy. In a first stage blade, the triple impingement holes are supplied with cooling air from a first leg of a triple pass (or, 3-pass) serpentine forward flow cooling circuit that provides cooling for the mid-chord region of the blade. A leading edge cooling supply channel provides impingement cooling to a supply cavity that then provides showerhead cooling for the leading edge. The triple impingement cooling holes are: formed in three ribs that are formed with a continuous flow channel formed between the ribs and the platform to provide strength to the ceramic core when the blade and internal cooling passages is cast. The blade also includes a continuous tip framing channel formed between the ribs and the blade tip for the same reason. A second embodiment used in a second, stage turbine blade includes the triple impingement cooling holes as in the first stage blade, but includes a 3-pass serpentine aft flow cooling circuit in which the last leg of the circuit supplies cooling air to the triple impingement cooling holes.

Because of the triple impingement holes with the three ribs extending in the spanwise direction, the high pressure air supplied to the first leg of the 3-pass serpentine flow circuit can be gradually decreased in pressure through a series of three impingement holes in order that adequate cooling can occur. Also, because of the continuous flow channels formed at the root framing channel and the tip framing channel, the ceramic core can be strong enough to withstand the bending and twisting that occur during the casting process. The ceramic core part that forms the impingement holes is adequately supported and held together with the remaining core that form the internal cooling passages of the blade.

DETAILED DESCRIPTION OF THE INVENTION

Figure 1:
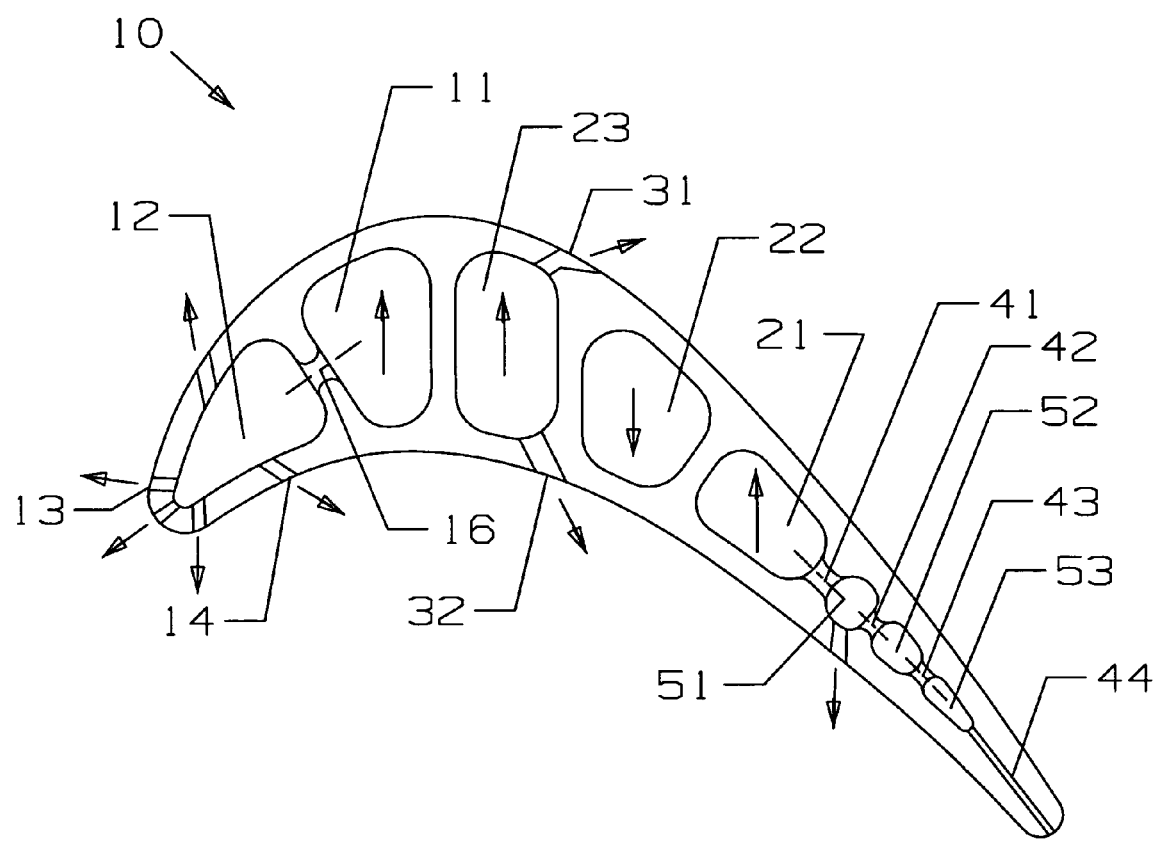
FIG. 1 shows a top view of a cross section of the cooling circuit used in a first stage turbine blade of the present invention.

The present invention is a ceramic core used to form a first or second stage turbine blade used in an industrial gas turbine (IGT) engine. One major difference between a first stage aero turbine blade and a first stage IGT blade is the size. The aero blade is from one to two inches in length, while the IGT blade is from five to ten inches in length. FIG. 1 shows a first stage turbine blade of the present invention used in an IGT engine. The blade 10 includes a leading edge cooling supply channel 11, one or more leading edge cooling cavities 12 connected to the supply channel 11 through one or more metering holes 16, a plurality of film cooling holes 13 connected to the cavity 12 to form a showerhead arrangement, and pressure side 14 and suction side 15 gill holes also connected to the supply cavity 12.

The mid-chord region of the first stage blade is cooled by a forward flow triple pass (or, 3-pass) serpentine flow cooling circuit that includes a first leg or channel 21 located adjacent to the trailing edge of the blade, a second leg 22 located upstream and adjacent to the first leg 21, and a third leg or channel 23 located upstream from and adjacent to the second leg or channel 22 of the triple pass serpentine flow circuit. The last leg or third leg or channel 23 of the serpentine flow circuit includes suction side film cooling holes 31 and pressure side film cooling holes 32 connected to the third channel to discharge film cooling air to the external surface of the blade. Cooling air is supplied to the first channel 21 through the blade root passage that is connected to the external source of pressurized cooling air such as the compressor of the engine.

Figure 2:
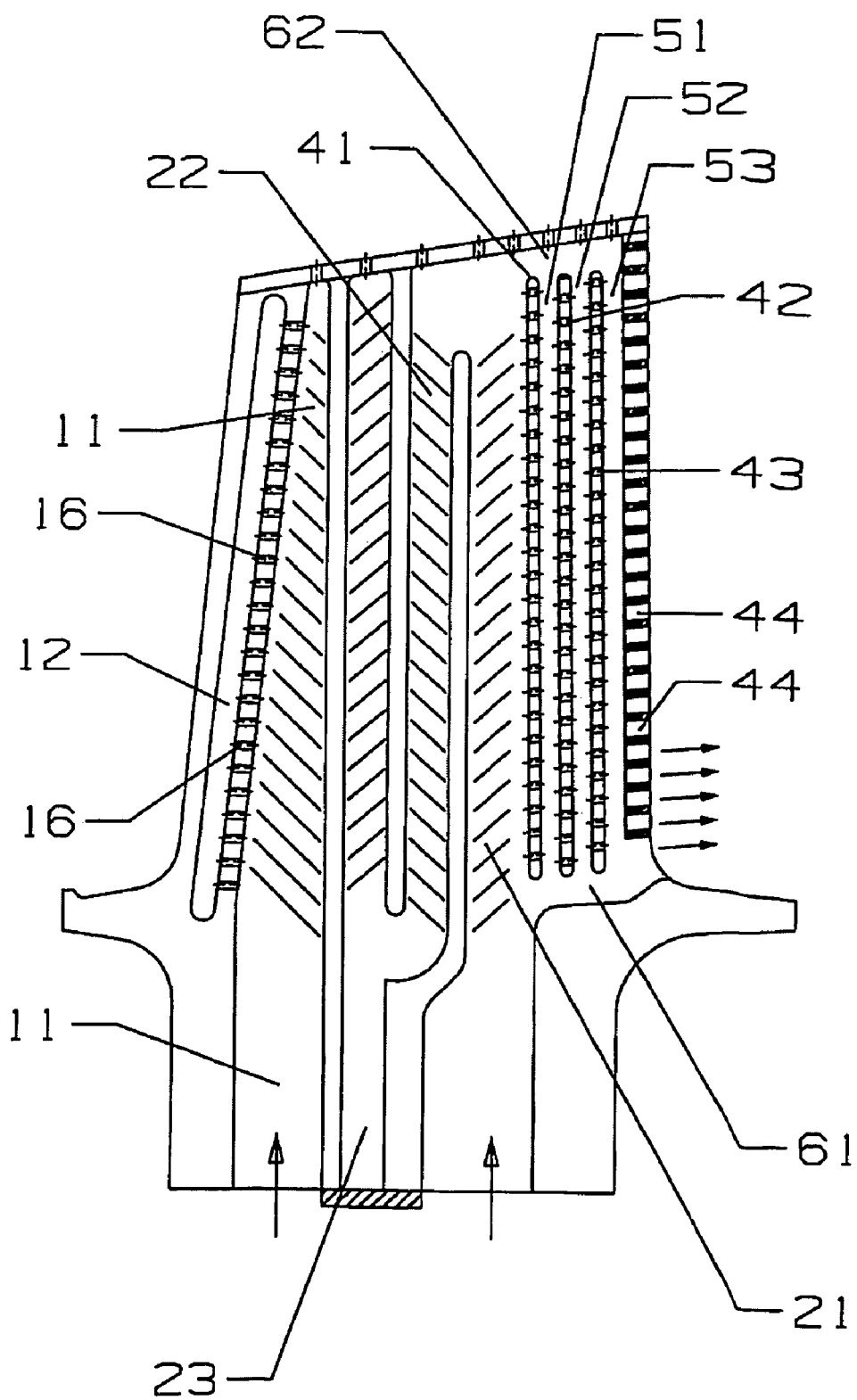
FIG. 2 shows a side view of a cross section of the first stage turbine blade of FIG. 1.

The trailing edge of the first stage blade is cooled with a series of impingement cooling holes located in ribs that then discharge into cooling holes or ducts arranged along the trailing edge of the blade. FIG. 2 shows a side view of a cross section of the first stage blade cooling circuitry. High pressure cooling air in the first channel 21 of the serpentine flow circuit passes through first impingement (or, metering) holes 41 located in a first rib that extend from near the tip to near the platform of the blade 10. A second and parallel rib includes second impingement or metering holes 42, and a third rib includes third impingement or metering holes 43. Adjacent ribs includes impingement holes that are staggered so that cooling air from an upstream impingement hole will not be in alignment with the downstream impingement hole. Impingement cavities 51, 52, and 53 are located between the ribs and exit holes 4-4.

A main feature of the present invention is the use of a continuous flow channel formed between the blade root and the ribs and between the blade tip and the ribs. A blade root framing channel 61 is located between the three ribs and the blade platform and forms a continuous cooling air flow channel along the blade root between the first channel 21 of the serpentine flow circuit and the exit holes 44. A continuous tip framing channel 62 is located on the opposite end of the ribs between the blade tip and forms a continuous cooling air passage between the first channel 21 and the exit holes 44 along the blade tip. The two channels 61 and 62 are formed from the ceramic core that will be described below.

The large turbine blade used in the first and second stages of an IGT require larger cooling air passages to supply the larger amount of cooling air required than would the prior art aero engine turbine blades. Use of only two impingement holes in series with two ribs as described in the Green et al '150 patent or the Liang '269 and '851 patents would not be practical because the impingement or metering holes in the ribs would be too large and therefore amount to too much cooling air flowing through the impingement holes. This would waste too much high pressure cooling air. A third rib with third impingement or metering holes are required for use in the MT blade because the cooling air pressure required in the first channel 21 of the serpentine flow circuit needs to be at high pressure in order to provide sufficient BFM (back flow margin) for the pressure side and suction side film cooling holes at the last leg of the serpentine flow circuit. At such a high supply pressure from the first channel 21 to the first impingement hole 41, a series of three impingement holes are required to decrease the cooling air pressure before discharging the cooling air through the exit holes 44. It is desirable for the cooling air to be gradually decreased in pressure through the three series of impingement holes through three gradual decreases in pressure instead of two larger decreases in pressure (required for the twin impingement arrangement in these three cited prior art patents) in order to control and regulate the cooling air pressure and flow through the trailing edge passages.

Figure 3:
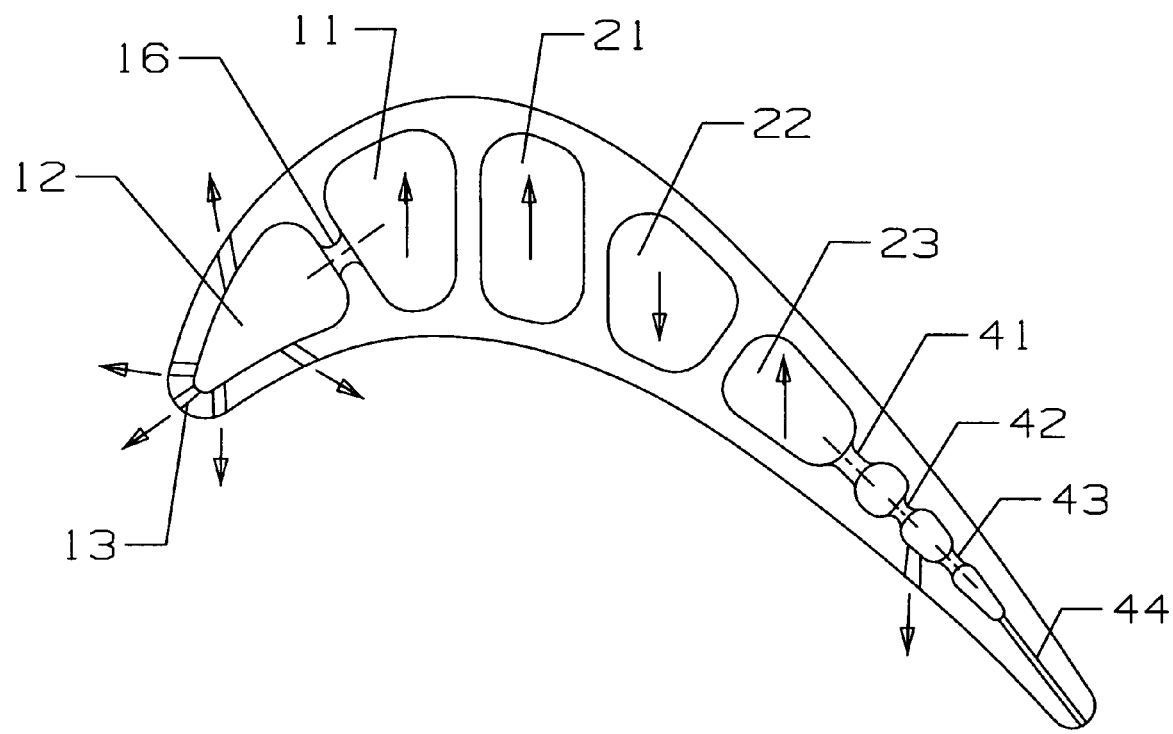
FIG. 3 shows a top view of a cross section of the cooling circuit used in a second stage turbine blade of the present invention.

FIG. 3 shows a second stage turbine blade of the present invention that is used in an IGT engine. The trailing edge cooling circuit and the leading edge cooling circuit is the same as in the first stage blade of FIGS. 1 and 2 above. The leading edge includes the cooling supply channel 11, the metering holes 16, the leading edge cavity 12, and the showerhead film cooling holes 13, and the series of three impingement holes 41-43 and the exit cooling holes 44. However, since the second stage blade is exposed to a lower temperature hot gas flow than is the first stage blade, the cooling-air flow required is less. In the second stage blade, the mid-chord region of the blade is also cooled by a triple pass (or, 3-pass) serpentine flow circuit, but the serpentine flow circuit is an aft flowing circuit as opposed to the forward flowing circuit in the first stage blade. The first leg or channel 21 of the serpentine flow circuit in the second blade is located adjacent et to the leading edge region, the second leg or channel 22 is located downstream from the first channel 21, and the last or third leg or channel 23 is located adjacent to the trailing edge region. The first impingement holes 41 are connected to the third or last channel 23 of the serpentine flow cooling circuit. In the second blade cooling circuitry, the high pressure cooling air is supplied to the first channel 21 and flows through the serpentine flow circuit and into the third channel 23 before passing through the series of three impingement holes 41-43. The three ribs that form the three impingement holes 41-43 also form the continuous tip framing channel 62 and continuous root framing channel 61 as described in the first stage blade above.

Figure 4:
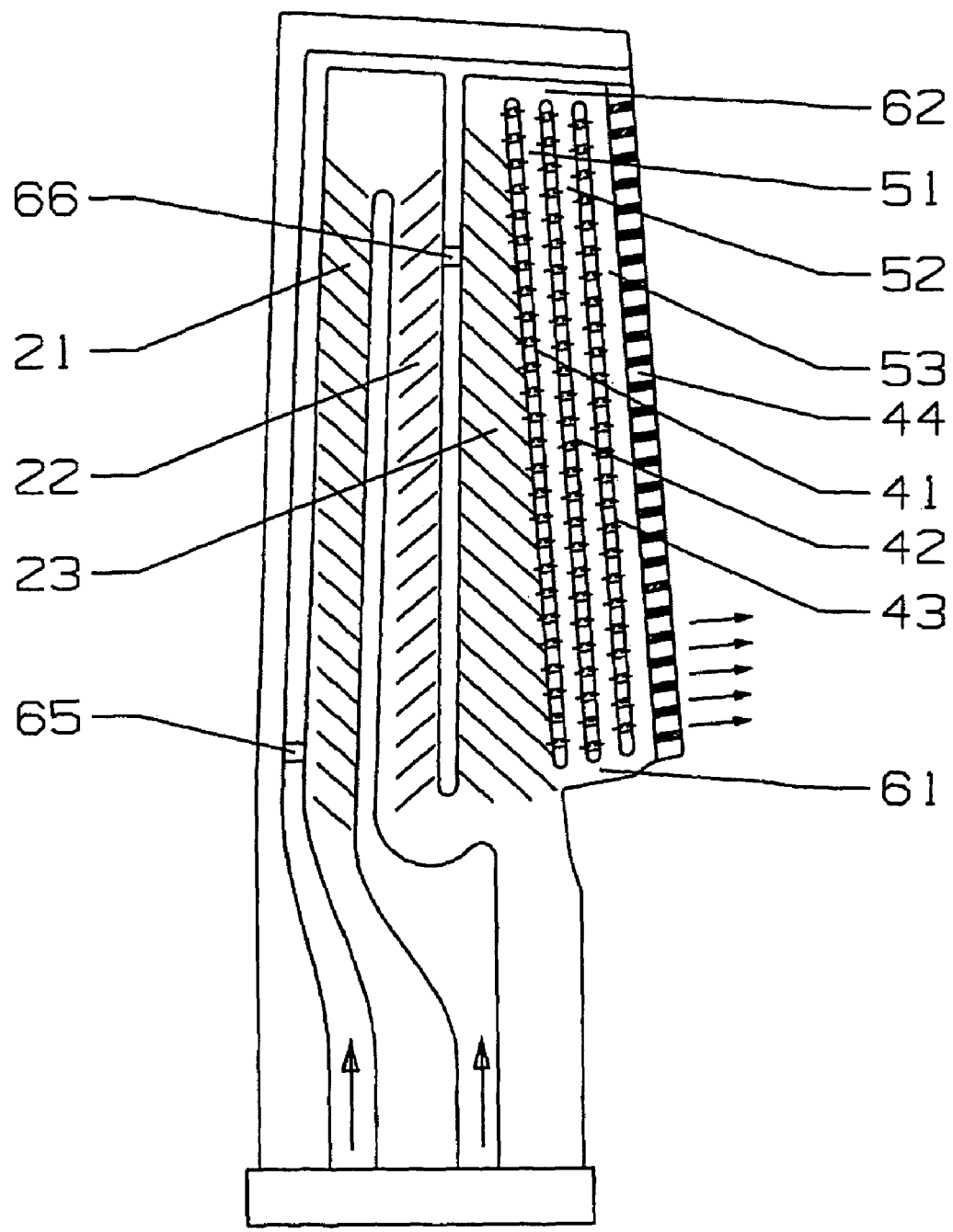
FIG. 4 shows a side view of a ceramic core used to make the internal cooling circuit of the trailing edge region with the triple impingement holes.

FIG. 4 shows a ceramic core that is used to make the triple impingement cooling holes formed in the trailing edge region of the first and second stage blades of the present invention. The ceramic core shown in FIG. 4 is missing the leading edge cooling circuit as described above. However, the triple impingement holes along with the continuous tip 62 and root 61 framing channels are adequately shown in FIG. 4. A 3-pass serpentine flow circuit is shown with a first leg 21, a second leg 22 and a third leg 23 to carry cooling air to the series of three impingement holes. The ceramic core represents the internal cooling passages that will be formed within the cast blade. Because the three impingement holes used in the present invention large turbine blade are small, the ceramic core section that forms these impingement holes is not supported much by the remaining ceramic core parts. When the ceramic core is placed within a mold to form the blade, high twisting stress will be placed on the ceramic core and the trailing edge forming section could break off. In the prior art Liang '851 and '269 patents, the trailing edge portion of the ceramic core is supported only by the impingement hole forming parts. In the present invention shown in FIG. 4, the ceramic core portions that form the continuous flow channels 61 and 62 used in the tip and root provide additional support for the ceramic core portion that forms the trailing edge impingement holes and exit holes.

Figure 5:
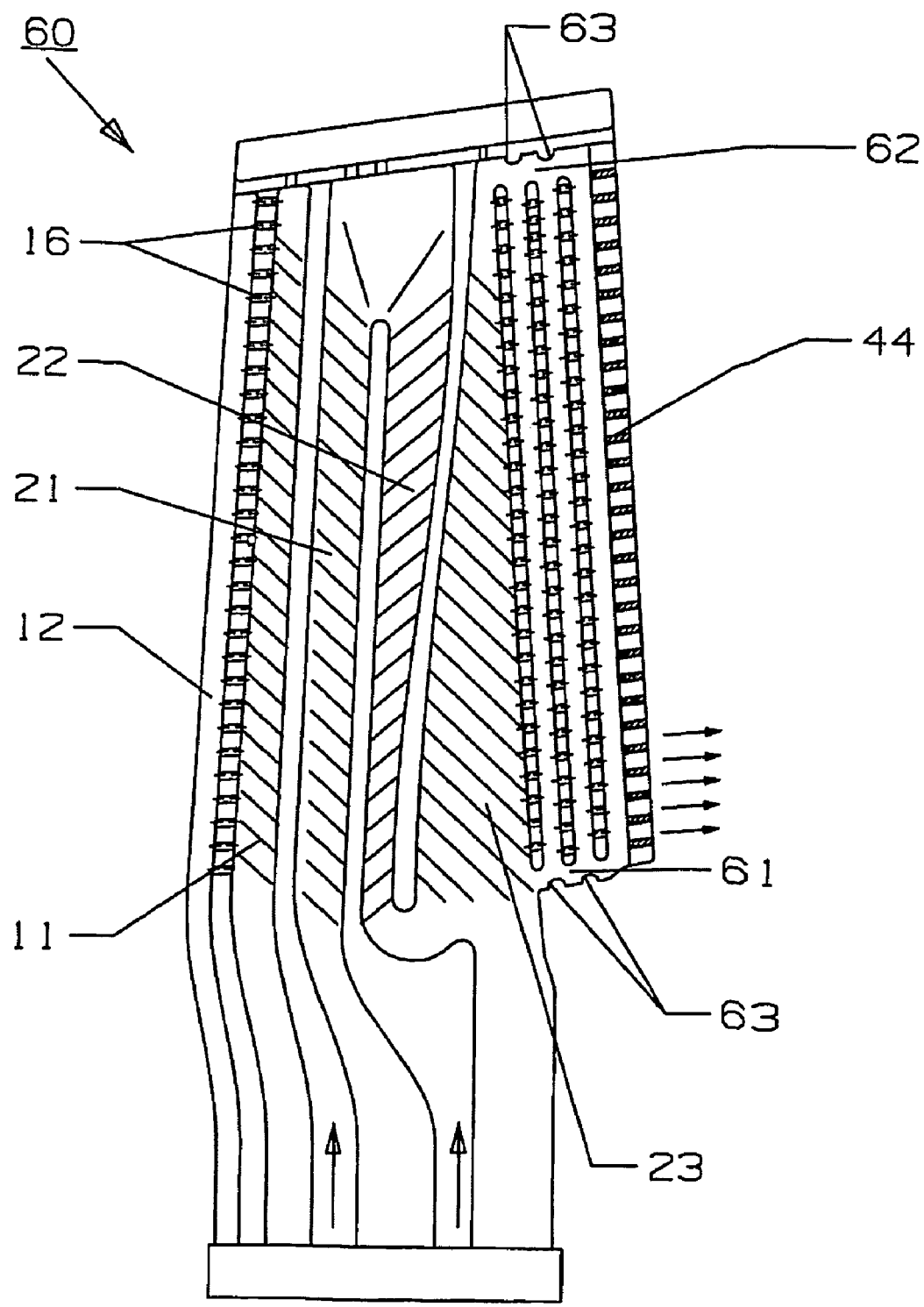
FIG. 5 shows a ceramic core used to form the second stage blade of the present invention.

The first stage blade is exposed to the highest temperature hot gas flow and therefore requires more internal cooling than would the second stage blade. In order to provide a more efficient cooling circuit for the second stage blade, the serpentine flow circuit is formed to flow in the aft direction. The higher pressure occurs in the first leg or channel 21 of the triple pass serpentine flow circuit. The last or third channel 23 is at a lower pressure than the first channel 21 and is used to supply the cooling air to the series of impingement holes in the trailing edge region. FIG. 5 shows a ceramic core 60 used to make the second stage turbine blade of the present invention. The ceramic core includes portions that are used to form the leading edge cooling supply channel 11 and the leading edge cavity 12. These two pieces are held together by the metering hole 16 forming pieces. The triple pass serpentine flow channels 21-23 are formed as a single piece and are held in place by two core ties at the tip. The trailing edge cooling circuit with the series of three impingement holes is held to the serpentine forming piece by the ceramic core pieces that form the first row of impingement holes and the core pieces that form the continuous flow channels 61 and 62 in the root and the tip section of the blade. In the FIG. 5 ceramic core, the continuous channels 61 and 62 have projection forming pieces 63 located inline with the channels 51 and 52 formed between impingement holes. These pieces of the ceramic core add strength and stiffness to the over-all ceramic core and limit breakage of the core during the casting process. The ceramic core 60 shown in FIG. 5 is used to form the second stage turbine blade of the IGT engine. However, the first stage blade is also produced from a ceramic core similar to that shown in FIG. 5 using the series of impingement forming pieces and the continuous channel 61 and 62 forming pieces and the projections 63 with the forward flowing serpentine flow cooling circuit shown in FIG. 2.

The leading edge flow circuit provides cooling primarily for the leading edge which is a critical part of the blade from a durability standpoint. Cooling air is fed into the airfoil through a single pass radial channel. Skew trip strips are used on the pressure side and suction side inner walls of the cooling channel to augment the internal heat transfer performance. A plurality of impingement jets of cooling air from the cooling supply passage through a row of crossover metering holes in the first partition rib to provide backside impingement cooling for the blade leading edge inner surface. The crossover holes are designed to support the leading edge ceramic core during casting of the blade, including removal of ceramic core material during the manufacturing cycle by means of the well known leaching process. The spent impingement cooling air is then discharged through a series of small diameter showerhead film cooling holes at a relative radial angle with the leading edge surface. A portion of the impingement air is also discharged through the pressure and suction side gill holes. A combination of impingement cooling, convection cooling and film cooling maintain the blade leading edge metal temperature within acceptable levels. The ability to cast this cooling circuit arrangement has been demonstrated. Also, multiple cooling cavity compartments connected through metering holes to the supply channel can also be used in the leading edge impingement channel to regulate the pressure ratio across the leading edge showerhead, eliminating showerhead film blow-off problems and achieving optimum cooling performance with adequate backflow pressure margin and minimum cooling flow.

The mid-chord cooling flow circuit is supplied through a separate opening and cooling air progresses forward through a triple pass serpentine flow cooling circuit. The partitions forming this serpentine flow circuit is specially arranged to provide for a high structural integrity, proper flow area and pressure drop design and means for supporting the ceramic cores during casting so that the blade can be made in one piece. A series of trip strips are incorporated within the serpentine flow channels for augmentation of internal heat transfer performance. The cooling air passing through the serpentine flow circuit is then discharged through compound oriented multi-diffusion film cooling holes on the blade pressure and suction surfaces as well as in the integrally cast tip surface. A half root turn cooling flow passage is used in the triple pass serpentine flow circuit. The serpentine ceramic core is extended from the half root turn to the blade inlet region for core support and possible future cooling air addition.

The tip region of the blade is designed to be integrally cast in with the rest of the blade. No bonded-on covers or attached caps are required for tip closure. Specially arranged core print-outs provide adequate tip core support for the serpentine flow ceramic core structure. A simple plug weld is made in each of the core print-outs to completely close the tip surface. An array of film cooling holes placed near the edge of the pressure side tip surface provides adequate cooling of the tip section metal temperature.

For the airfoil trailing edge region, a portion of the cooling air from the first channel of the serpentine flow circuit is discharged through a triple multiple cooling air metering and camber line bleed cooling air discharge flow control arrangement. Air is directed into a rear cavity through a row of small metering holes optimized for casting and cooling requirements. The spent cooling air then flows through another row of metering holes at staggered arrangement with respect to the upstream metering holes. This flow metering process repeats again and the cooling air is finally discharged from the blade trailing edge through a row of cooling slots or cooling holes. Utilization of this particular type of cooling flow control structure yields an optimum cooling flow distribution for a high pressure ratio across the airfoil or across the airfoil trailing edge section. Typical cooling air pressure ratio across the entire trailing edge is around 1.6 with the triple metering flow control structure of the present invention producing a cooling pressure ratio of around 1.125 across each of the three rows of metering holes. If the pressure across each metering row is too high, then the cooling flow will be very sensitive to the metering hole geometry variation. If the pressure across the metering row is too low, then the metering hole geometry will provide very little control of the cooling air flow.

The trailing edge cavities and their associated metering holes are designed while considering both heat transfer effectiveness and ability to cast the blade, including leaching the ceramic core material after casting as well as the formation requirement for the ceramic core stiffness in the manufacturing process.

Some major design requirements for the metering rib construction over the prior art trailing edge design are described below. A minimum metering hole size of 1.3 mm with a maximum spacing of 5.0 mm apart between metering holes is required for the trailing edge metering ribs. This translates into a hypothesized mode of core breakage due to shear requirement greater than 0.25 mm for a typical industrial size turbine blade. With this shear parameter criterion, the airfoil trailing edge ceramic core stiffness will improve the manufacture casting yields and minimize the ceramic core breakage due to shear which is caused by the differential shrink rates of the ceramic core, the external shell, and the molten metal.

The spacing between each individual metering rib is positioned at a spacing to metering hole diameter ratio of less than 5 except for the spacing between the third rib and the trailing edge exit hole or slot, which can be greater than 5 but less than 7 due to the converging angle of the airfoil trailing edge. A typical airfoil trailing edge is designed with a wedge angle of around 13 degrees. With these hypothesized geometry dimensions, a range of overall trailing edge bending parameter less than 850 per mm square is required to establish a good moment of inertia for the ceramic core is achieved. This reduces the bending stress and improves the resistance due to overall trailing edge bending.

Since the moment of inertia is proportion to the ceramic core thickness, special local wall-to-wall edge framing construction design is used to provide additional increase in the moment of inertia for the ceramic core which improves the resistance to trailing edge local edge bending. The framing at both root and tip section is in a formation of a continuous channel tapered from the supply channel thickness down to the thickness of the cooling exit slot width. This is different from the prior art 2-to-1 or 3-to-2-to-1 framing approach.

I claim:

1. A first stage or second stage turbine blade for an industrial gas turbine engine, the turbine blade comprising:
   a leading edge and a trailing edge forming an airfoil extending from a platform to a blade tip;
   a trailing edge region of the airfoil including a row of exit cooling holes extending from the platform to the blade tip;
   the trailing edge region including three rows of metering holes that form a triple impingement cooling flow, the three rows of metering holes extending from the platform region to the blade tip;
   a three-pass forward flowing serpentine flow cooling circuit with first leg being a cooling air supply channel located adjacent to trailing edge region;
   the first leg of the serpentine flow circuit extending to an inner surface of the blade tip;
   a lower continuous flow cooling air channel formed between the three rows of metering holes and the platform and connected to the first leg of the serpentine flow circuit;
   an upper continuous flow cooling air channel formed between the three rows of metering holes and the inner surface of the blade tip and connected to the first leg of the serpentine flow circuit; and, the inner surface of the blade tip and the first row of metering holes and the lower and the upper continuous flow cooling air channels form a side of the first leg of the serpentine flow cooling circuit.

2. The first stage or second stage turbine blade of claim 1, and further comprising:
   the blade tip includes tip cooling holes connected to the first leg of the serpentine flow cooling circuit and the upper continuous flow cooling air channel.

3. The first stage or second stage turbine blade of claim 1, and further comprising:
   the blade tip forms a surface for a turn from the first leg to the second leg of the serpentine flow cooling circuit.

4. The first stage or second stage turbine blade of claim 1, and further comprising:
   a leading edge cooling air supply channel connected to a leading edge impingement cavity through a row of metering and impingement holes;
   the third leg of the serpentine flow cooling circuit being located adjacent to the leading edge cooling air supply channel; and,
   the third leg of the serpentine flow cooling circuit is not fluidly connected to the leading edge cooling air supply channel such that cooling air from one flows into the other.

5. The first stage or second stage turbine blade of claim 1, and further comprising:
   the upper and lower continuous flow cooling air channels are of such size that a single ceramic core can be used to cast the first or second stage turbine blade of the industrial gas turbine engine with the trailing edge cooling circuit and the serpentine flow cooling circuit cast from the single ceramic core.

6. The first stage or second stage turbine blade of claim 1, and further comprising:
   the upper and lower continuous flow cooling air channels form a bypass passage for the cooling air around the triple impingement metering holes.

7. The first stage or second stage turbine blade of claim 6, and further comprising:
   the metering holes and the continuous flow channels are sized such that a cooling air pressure ratio across the entire trailing edge is around 1.6 and the cooling pressure ration across each row of metering holes is about 1.125.

8. A process for cooling a first stage or a second stage turbine blade of an industrial gas turbine engine, the process comprising the steps of:
   supplying pressurized cooling air to a first channel located adjacent to a trailing edge region of the airfoil;
   metering the pressurized cooling air from the first channel through three rows of metering holes that extend from near a platform to near a blade tip inner surface to provide triple impingement cooling;
   passing some of the pressurized cooling air from the first channel around the metering holes through a lower continuous passage formed between the platform and the rows of metering holes to bypass the rows of metering holes;
   passing some of the pressurized cooling air from the first channel around the metering holes through an upper continuous passage formed between the platform and the rows of metering holes to bypass the rows of metering holes;
   passing the cooling air from the first channel through a second and third channel that forms a triple pass serpentine flow cooling circuit;
   passing pressurized cooling air through a leading edge cooling air supply channel located adjacent to the third leg of the serpentine flow circuit; and,
   impinging the cooling air from the leading edge cooling air supply channel into a leading edge impingement cavity to provide near wall cooling to the leading edge of the airfoil.

9. The process for cooling a first stage or a second stage turbine blade of claim 8, and further comprising the step of:
   discharging some of the cooling air from the first channel and the upper continuous passage through blade tip holes to provide cooling for the blade tip.

10. The process for cooling a first stage or a second stage turbine blade of claim 9, and further comprising the step of:
   passing the cooling air from the first channel of the serpentine circuit that does not flow through the metering holes or the upper or lower continuous passages or the blade tip holes into the second channel of the serpentine circuit.

\* \* \* \* \*